July 5, 1927.
A. T. HOLMES
ROD CLAMP
Filed Nov. 1, 1926
1,634,422
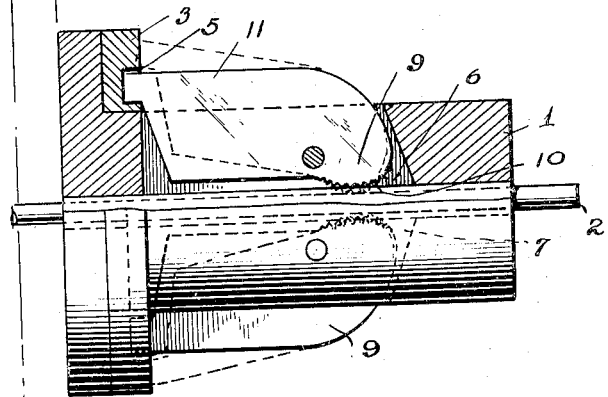
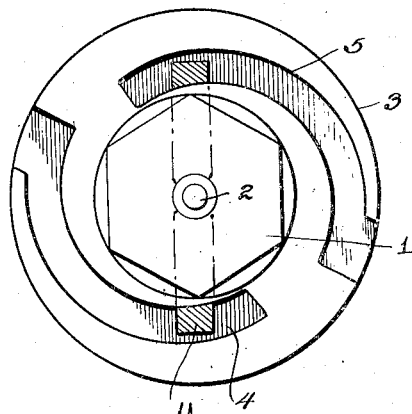
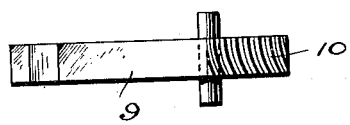
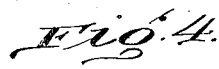
Inventor
Allan T. Holmes Patented July 5, 1927.

1,634,422

UNITED STATES PATENT OFFICE.

ALLAN T. HOLMES, OF RICHMOND, VIRGINIA, ASSIGNOR OF ONE-HALF TO JULIE D. HOLMES, OF RICHMOND, VIRGINIA.

ROD CLAMP.

Application filed November 1, 1926. Serial No. 145,660.

My invention relates to an improvement in rod clamps for use in concrete mold construction or wherever temporary fastening devices are required.

The object of my improvement is to provide a clamp that is easily and quickly locked in position and also readily detached.

Another object is to provide a clamping device having a minimum number of parts and which can be made from castings, without the necessity of machining the parts.

A further object is to provide a clamping device to be used in lieu of nuts and other screw threaded fastenings or locking devices.

With these and other objects in view, the invention consists in certain novel combinations and arrangements of the parts as will more fully appear from the following description of the preferred embodiment of the invention, the novel features thereof being pointed out in the appended claims.

In the drawings:

Figure 1 is a longitudinal sectional view of the clamping device;

Figure 2 is an end view of Fig. 1 showing the gripping jaws in section;

Figure 3 is a bottom view of one of the gripping jaws showing the gripping face with teeth at an acute angle;

Figure 4 is an end view of one of the gripping jaws:

The device as illustrated is designed to be used on any rod in lieu of a nut or other fastening means and which can be easily and quickly released from its clamped position and removed from the rod.

It has been customary to employ threaded rods to which nuts have been applied for purposes of locking. This means of fastening has proved very unsatisfactory for the reason that in building construction the rods have usually been threaded and when exposed to the weather have become rusted and frequently have had to be rethreaded; which consumes a large amount of time and also necessitates the renewal of both rods and nuts.

The device illustrated may be used indefinitely without renewing and effectively take the place of the customary nut or other fastening means.

As illustrated the device consists of a flanged cylindrical body member 1, adapted to slide longitudinally on the rod 2. Mounted on the body member 1, and bearing against the said flange is a rotatable ring 3, having inclined spiral grooves 4 and 5. Radial slots 6 and 7 extend longitudinally of and intersect the axial bore 8 through the cylindrical body member 1.

Within said slots 6 and 7, are eccentrically pivoted clamping jaws 9, having serrated concave gripping surfaces 10, which are adapted to cut into and firmly grip the rod 2. Each of the gripping jaws has an extension or tail 11, which are disposed within the grooves in ring 3.

The spiral grooves 4 and 5, are similar and their bottoms are similar inclined planes, so that when said ring is rotated about the cylindrical member the gripping jaws are simultaneously moved forward or backward, and their inner ends elevated or depressed, depending on whether the jaws are to be closed or released.

When the device is in the position shown in dotted lines in Figure 1 of the drawings, it is firmly clamped on the rod 2. If it is desired to remove the gripping device from the rod or move it into a new position it is only necessary to apply a wrench to rotate the ring 3 and the jaws will be easily and quickly released and the device free to be moved. When it is desired to again clamp the rod, it is only necessary to rotate the ring in the reverse direction and the jaws through the extensions and spiral grooves will firmly clamp the rod.

I do not limit my invention to the structure described and shown, as modifications, within the scope of the appended claims, may be made without departing from the spirit of my invention.

Having thus described the invention, what is claimed as new, and desired to be secured by Letters Patent is:

1. In a device of the class described, comprising a body member having an axial bore therethrough and provided with radial slots communicating with the bore, gripping jaws pivoted within said radial slots and projecting into said axial bore, and a ring rotatable upon the body and provided with means for operating said gripping jaws.

2. In a device of the class described, a cylindrical member having a longitudinal rod receiving bore extending the entire length thereof, and provided with radial slots communicating with the bore, gripping jaws pivoted within said slots and projecting into said longitudinal bore, and a rotatable ring mounted on said cylindrical member and having means for operating said gripping jaws.

3. In a device of the class described, comprising a body member having an axial bore therethrough and provided with radial slots communicating with the bore, eccentrically pivoted gripping jaws adapted to extend into said bore, and a rotatable member mounted upon said body member and provided with means for opening and closing said gripping jaws.

4. In a device of the class described, comprising a body member having an axial bore extending therethrough and provided with a slot communicating with the bore, a gripping member pivoted on said body member, and projecting into said axial bore, and a rotatable member carried upon said body member and having means for operating said gripping member.

5. In a device of the class described, a cylindrical body member having a longitudinal rod receiving bore extending the entire length thereof, and provided with radial slots communicating with the said longitudinal bore, jaws having serrated concave gripping faces pivoted within said slots and projecting into said longitudinal bore, and a ring rotatable on said cylindrical member and provided with means for operating said gripping jaws.

6. In a device of the class described, a cylindrical member, having a longitudinal bore extending the length thereof, radial slots connecting said bore, pivoted jaws having tails, a ring member having inclined spiral grooves and supported by said cylindrical member, said tails entering said grooves, whereby said tails are simultaneously operated to open or close said jaws.

In testimony whereof I affix my signature.

ALLAN T. HOLMES.